Oct. 27, 1931. C. F. M. VAN BERKEL 1,829,315
WEIGHING APPARATUS
Filed April 10, 1929 2 Sheets-Sheet 1

INVENTOR:
Cornelis F. M. van Berkel
By Chas. M. Nissen
ATTY.

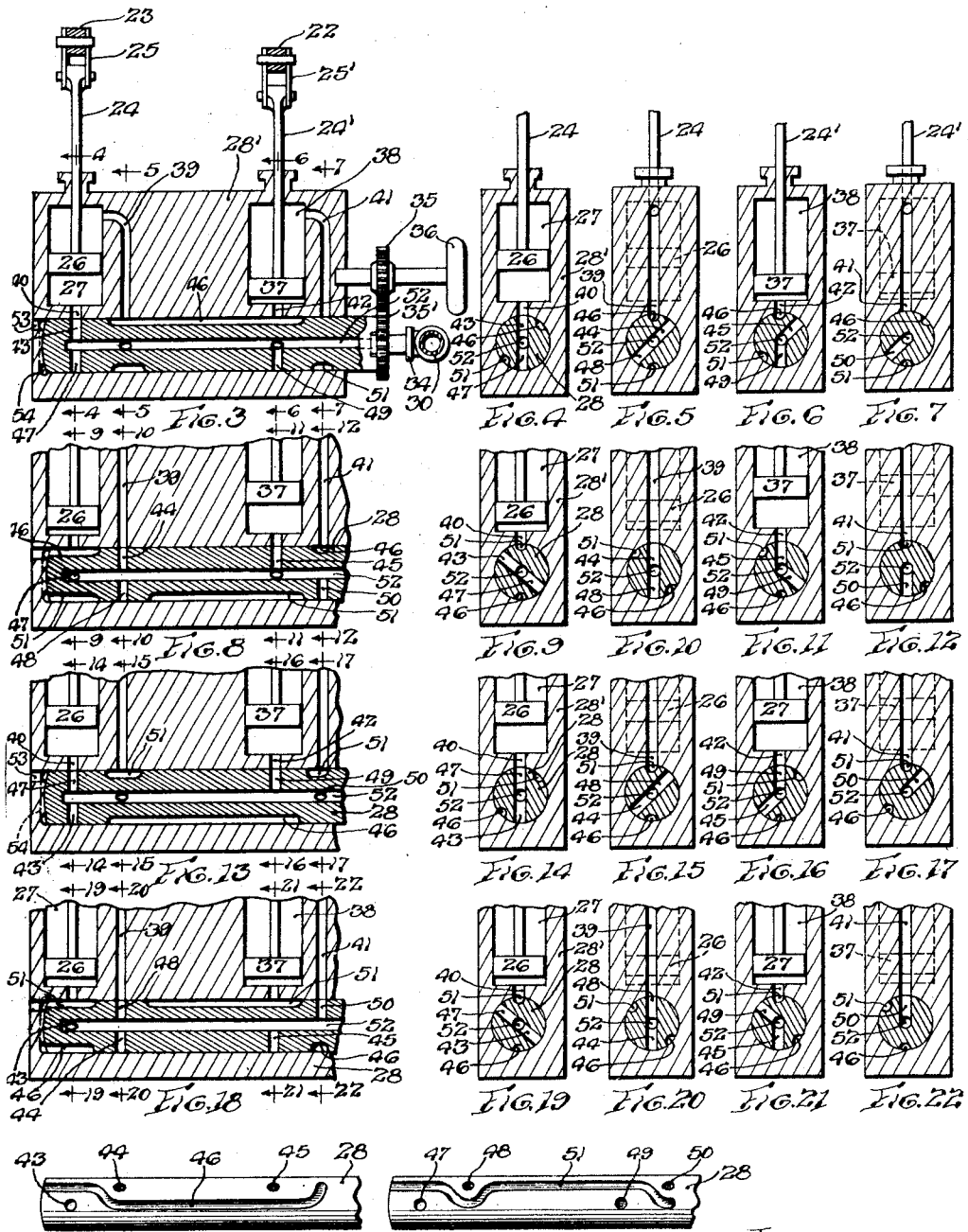

Patented Oct. 27, 1931

1,829,315

UNITED STATES PATENT OFFICE

CORNELIS F. M. VAN BERKEL, OF WASSENAAR, NETHERLANDS, ASSIGNOR TO NAAMLOOZE VENNOOTSCHAP MAATSCHAPPIJ TOT VERVAARDIGING VAN SNIJMACHINES VOLGENS VAN BERKEL'S PATENT EN VAN ANDERE WERKTUIGEN, OF ROTTERDAM, NETHERLANDS, A LIMITED LIABILITY COMPANY OF THE NETHERLANDS

WEIGHING APPARATUS

Application filed April 10, 1929, Serial No. 353,924, and in Great Britain April 19, 1928.

The present invention relates to weighing apparatus and refers to that type of machine in which there is provided a means for increasing or decreasing the weighing capacity of the apparatus. In devices of this nature, the capacity is usually increased or decreased by applying or removing supplementary weights to or from the moving parts of the apparatus.

One object of the present invention is to apply the weights to one of the moving parts of the apparatus, or remove the same therefrom, by means operated by fluid pressure. This fluid pressure may be pneumatic or hydraulic.

Another object of the present invention is to provide a means whereby the weights may be applied to the moving parts of the weighing apparatus either individually or collectively and removed therefrom in a corresponding manner. In this way, the number of different weights necessary is minimized.

Another object of the present invention is to provide means which will insure that the weights rest on the moving parts of the weighing apparatus free from the means which is adapted to place the weight therebetween.

Still another object of the invention is to provide a means which will insure that the weights will be lifted clear of the moving parts of the weighing mechanism when not desired for the purpose of increasing the weighing capacity thereof.

In order that the invention may be understood more fully, reference is had to the accompanying drawings in which:—

Fig. 3 is a cross section on the line 3—3 of Fig. 1 showing the operating means for manipulating the levers, with the operating means in one position of adjustment;

Figure 1:
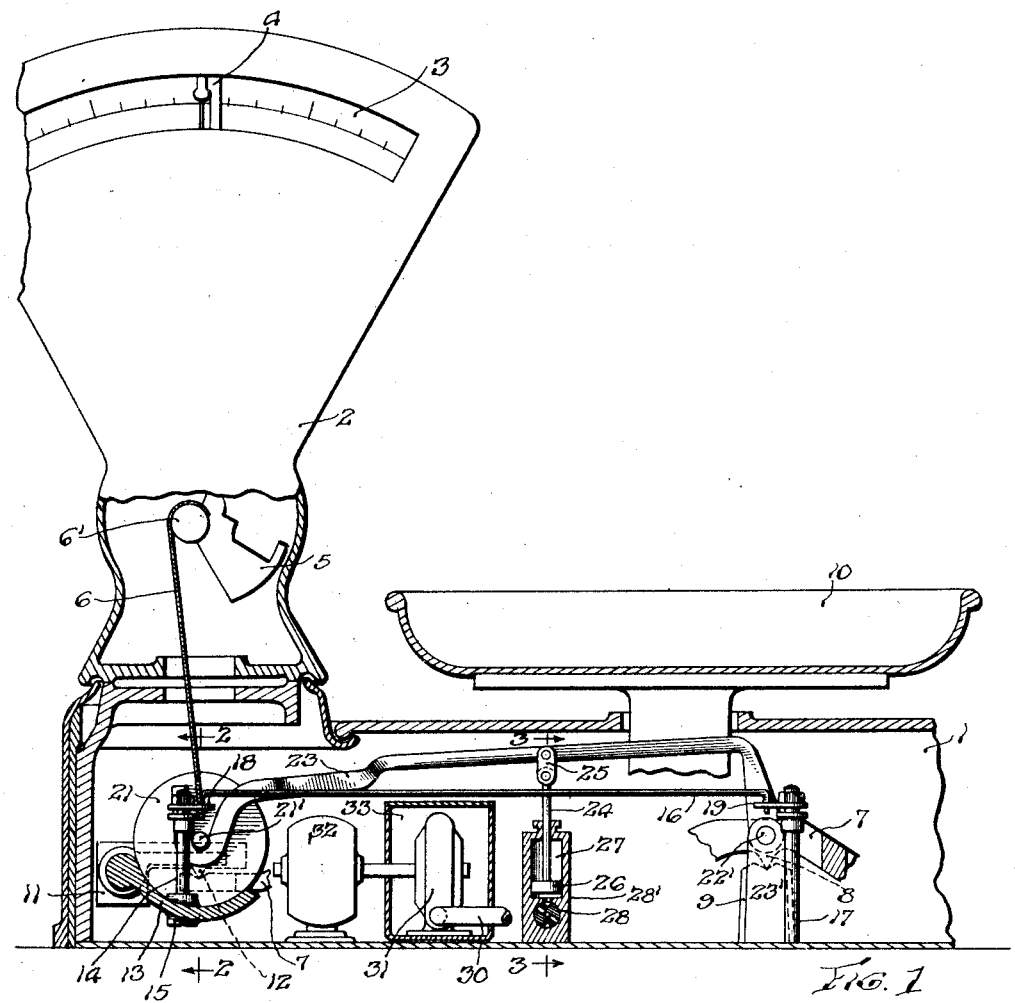
Fig. 1 is a vertical sectional view through a device embodying my invention.
Figure 2:
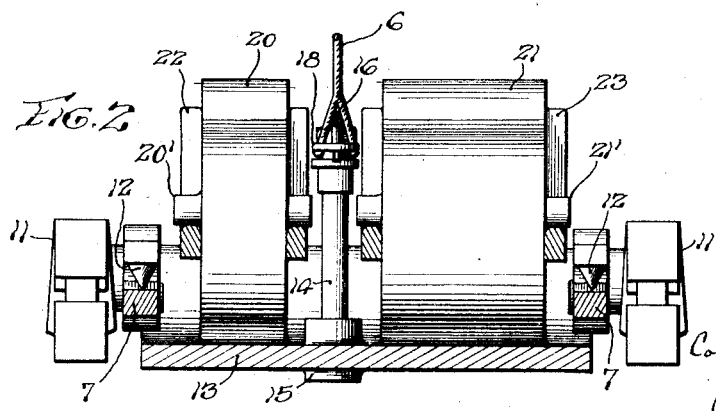
Fig. 2 is a cross section on the line 2—2 of Fig. 1.

Figs. 4, 5, 6 and 7 are cross sections on the lines 4—4, 5—5, 6—6, and 7—7, respectively, of Fig. 3;

Fig. 8 is a view similar to Fig. 3 showing the operating means in a slightly different position;

Figs. 9, 10, 11 and 12 are cross sections on the lines 9—9, 10—10, 11—11 and 12—12 of Fig. 8;

Fig. 13 is a view similar to Figs. 3 and 8 but showing the operating parts in still another position;

Figs. 14, 15, 16 and 17 are cross sections along the lines 14—14, 15—15, 16—16 and 17—17 of Fig. 13;

Fig. 18 is a view similar to Figs. 3, 8 and 13 but showing another position for the operating means;

Figs. 19, 20, 21 and 22 are cross sections along the lines 19—19, 20—20, 21—21 and 22—22 of Fig. 18;

Fig. 23 is a plan view of the valve member as viewed from above in Fig. 3; and

Fig. 24 is a corresponding view of the opposite surface of the valve member shown in Fig. 23.

In the drawings, the device is shown as applied to a weighing device such as described in British Patent, No. 295,853. Parts of the weighing mechanism have been omitted for the sake of clearness, only enough of the same being included to show the operation of the present invention, it being understood that the weighing apparatus is constructed in the manner illustrated in said British patent.

A weighing scale having a base 1 has an upstanding casing member 2 mounted thereon, said casing enclosing the pointer 4 which co-operates with the scale 3 to indicate the weight of the article being weighed. The pointer is counter-balanced by means of a weight 5 which normally tends to move the pointer to the right, as seen in Fig. 1. A cord 6 is wound about the drum 6' which is mounted on the pivot of the pointer 4 and tends to move the pointer to the left when a downward pull is exerted on the cord. Sections of the weigh beam 7 are shown at the right and left in Fig. 1, the part at the right being adapted to support the scale pan 10 by means not shown. The weigh beam 7 is mounted upon the bearing 9 by means of the knife edge 8 and rotates in a clockwise direction when goods to be weighed are placed upon the scale pan 10. This movement of the weigh beam moves the portion of the weigh beam shown at the left in an upward direction which removes some of the tension from the cord 6 and permits the weight 5 to move the pointer 4 to the right, the normal position of the pointer being to the extreme left when no articles are being weighed.

When the pointer 4 has reached its extreme right hand position, the scale is not capable of weighing articles which are of any greater weight than that indicated unless additional means are used to increase the normal weighing capacity thereof. In the present device, means are provided for such a purpose and includes a weight or a plurality of weights which may be placed in such a position as to exert a downward pull on the end of the weigh beam 7 shown at the left in Fig. 1. The pointer 4 is thereby brought back to the extreme left position and can again move to the right until it reaches its extreme right hand position, the weight of the article being weighed equalling the effective weight of the weights placed on the weigh beam plus the weight indicated by the pointer 4. Means may be provided to co-operate with the scale 3 to change the amounts indicated thereon as the additional weights are added so that the scale automatically registers the correct weight of the article being weighed, such a means being disclosed in the British patent before mentioned.

In the embodiment shown, a member 11 having a knife edge 12 engaging the end of the weigh beam 7 is adapted to support a plurality of weights. A member 13, substantially trough-shaped, is fixed rigidly to the member 11. Fixed to the member 13 within the bearing 15 is an upstanding rod 14 which has a link 18 at its upper end. A second rod 17 has a link 19 at its upper end and both the links 18 and 19 are connected to the rod 16 in the manner illustrated so that the ends of the rods are directly over the knife edges 12 and 8. The rods 14 and 17, together with the rod 16 and weigh beam 7, form a parallel motion linkage, more fully described in the above-mentioned British patent. This restrains the member 11 to move to successive parallel position.

The weights 20 and 21 are shown as cylindrical weights having trunnions 20' and 21' adapted to be engaged by the forked ends of the levers 22 and 23 respectively. These levers 22 and 23 are for the purpose of lifting the weights from the member 11 and lowering them onto the member 11 when desired. The member 11 has the portion 13 in the present instance of a shape corresponding to that of the weights 20 and 21. The levers 22 and 23 are pivoted at 22' to a bracket 23'.

In Fig. 1, there is shown a piston 26 operating in a cylinder 27 and movement of this piston in the cylinder moves the lever 23 through the piston rod 24 and connecting link 25. A piston 37, similar to the piston 26, has a piston rod 24' connected by a link 25' to the lever 22 for manipulating the weight 20.

A valve 28 is rotatably mounted in the lower part of the casing 28' in which the cylinders 27 and 38 are formed, and openings 40 and 42 form communicating means between the lower parts of the cylinders and the various ports on the valve 28, and openings 39 and 41 form communicating means between the upper portions of the cylinders 27 and 38 and the ports on the valve 28.

A pump 31 is driven by a motor 32 and is adapted to pump fluid from the chamber 33 through a pipe connection 30 to the valve 28 to which it is coupled by means of a swiveled connection 34. The valve 28 is rotated by means of a handle 36 and gears 35 and 35', the latter being rigid with the valve and the former being rigid with the shaft upon which the wheel 36 is rigidly fastened.

The fluid pumped by means of the pump 31 enters the central opening 52 in the valve 28 and communicating with this opening are the ports 43, 44, 45, 47, 48, 49 and 50, shown in Figs. 3 to 24, inclusive. On the upper side of the valve, as seen in Fig. 3 is an exhaust port 46 and on the lower side thereof is an exhaust port 51. The ports 43 to 51, inclusive, are adapted to co-operate with the openings 40, 39, 42 and 41 to produce reciprocation of the pistons 26 and 37 in the proper direction to raise or lower the weights, as the case may be.

The valve ports are so arranged that with the parts in the position shown in Fig. 18, both of the pistons 26 and 37 are in their lowermost positions, and, hence, the weights 20 and 21 are both resting upon the member 11 so that a maximum capacity is given to the weighing apparatus illustrated. It will be noted that the weights 20 and 21 are in the ratio of one to two so that the weighing capacity of the scale may be increased from that indicated by the scale 3 to an amount equal to two, three and four times the capacity indicated on the scale 3, and more weights may be used, as desired, to increase the scale's capacity a still greater amount.

To increase the weighing capacity of the scale to twice that indicated on the scale 3, the weight 20 should rest on the member 13 and the weight 21 should be in raised position, free of the member 13. To do this, the valve is rotated until it is in the position illustrated in Figs. 3 to 7, inclusive.

In this position, the fluid in the opening 52 passes through the port 43 and the opening 40 into the lower portion of the cylinder 27, thus raising the piston 26 to thereby raise the lever 23 and consequently the weight 21, to its uppermost position free of the member 13. At the same time that the port 43 is in registration with the opening 40, the opening 39 is in communication with the exhaust port 46 and the fluid in the upper part of the cylinder passes through the opening 39 into the exhaust port 46 and, from there, into the annular recess 54 which has an opening 53 communicating with the outside of the member 28'. This opening 53 may be connected to the chamber 33 to return the fluid thereto so that it again may be used by the pump 33, as desired; except in the case where a pneumatic fluid is used, in which case no return is necessary from the opening 53 to the chamber 33. It will be noted that, in this position of the valve, the piston 37 is at its lowest position, as in Fig. 18 and therefore the weight 20 remains on the member 13.

Rotation of the valve 28 in a counter-clockwise direction, as seen in Fig. 4, and through an angle of 45°, brings the ports 44 and 45 in registration with the respective openings 39 and 42, as seen in Fig. 8. This causes the piston 37 to be raised, and, as a result, the weight 20 is raised from the member 13, the exhaust fluid in the upper part of the cylinder passing through the opening 41 into the exhaust port 46 and out through the opening 53, as previously described. As the weight 20 is lifted, the weight 21 is lowered onto the support 13 since the port 44 now permits the pressure fluid to pass through the opening 39 into the upper end of the cylinder 27 to force the piston down, the exhaust fluid in the lower part of the cylinder escaping through the opening 40 to the exhaust port 46 and out through the opening 53. With the weight 21 resting on the member 13 and the weight 20 being free of the member 13, the weighing capacity of the scales has been increased to three times its normal capacity.

To increase the weighing capacity of the scales to four times the normal weighing capacity thereof, the valve is rotated until it is in the position shown in Fig. 18. In this position, the ports 48 and 50 permit the pressure fluid from the opening 52 to pass through the openings 39 and 41 into the upper parts of the cylinders 27 and 38 respectively to force the pistons downwardly. This lowers the levers 22 and 23 until the weights 20 and 21 have been deposited on the member 13. The exhaust fluid in the lower parts of these cylinders pass through the openings 40 and 42 into the exhaust port 51 and out through the opening 53, as previously described with reference to the port 46.

To arrange the weights so that only the normal capacity of the scales is utilized, the weights must be in raised position so that they are free from the member 13. To raise the weights simultaneously, the valve is turned to the position shown in Fig. 13. In this position of the valve, the ports 47 and 49 permit the pressure fluid in the opening 52 to pass to the lower parts of both cylinders 27 and 38, thus raising the pistons. The exhaust fluid from the upper parts of these cylinders pass through the openings 39 and 41 into the exhaust port 51 and out through the opening 53.

Thus, it will be seen that by a simple rotation of the novel valve structure shown, it is possible to admit the pressure fluid to either the upper or lower parts of either cylinder 27 or 38. With the arrangement shown, it is possible to have either weight on the member 13, as desired, or to have both of them thereon at the same time, or to raise them to a position so that they are free of the member 13, thus giving any desired combinations thereof which might be desired. It will be understood, however, that the invention is not limited to the use of only two weights but is capable of modification so that more weights may be used by merely duplicating the structure shown or by using more cylinders than illustrated and constructing the valve so as to admit the fluid to the cylinders in such a manner as to operate pistons therein in a manner similar to that described. Thus, it is conceivable that any number of weights might be used to increase the weighing capacity the amount desired.

It is preferable to use atmospheric air as the pressure fluid and the device, as illustrated, shows a blower or pump 31 which is adapted to supply air to the valve. However, if a fluid such as water were used, the tank 33 would contain such fluid and the pump 31 would be such that it could be used for pumping the water.

It is also to be understood that, if desired, the weights may be permitted to return to their lowermost positions by the action of gravity but it is preferable to use a positive means to accomplish this result to insure that the levers 22 and 23 are not contacting with the trunnions 20' and 21' as this is likely to destroy the sensitivity of the apparatus.

Obviously those skilled in the art may make various changes in the details and arrangement of parts without departing from the spirit and scope of the invention as defined by the claims hereto appended, and I therefore do not wish to be restricted to the precise construction herein disclosed.

Having thus fully disclosed an embodiment of my invention, what I claim and desire to secure by Letters Patent of the United States is:—

1. In a weighing apparatus, the combination of a weigh beam operatively connected at its opposite ends to a scale pan and to an indicating means, and a series of weights adapted to be applied to said weigh beam in a predetermined order by fluid actuated means to increase the normal capacity of said weighing apparatus.

2. A weighing apparatus comprising a mechanism having a fixed normal weighing capacity, weights adapted to be applied thereto to increase said capacity, fluid operated means for selectively applying said weights to said mechanism, and a valve for controlling said fluid operated means.

3. A weighing apparatus comprising a mechanism having a fixed normal weighing capacity, weights adapted to be applied thereto to increase said capacity, fluid operated means for selectively applying said weights to said mechanism, and a rotary valve for controlling said fluid operated means.

4. A weighing apparatus comprising a mechanism having a fixed normal weighing capacity, a plurality of weights adapted to be added thereto for increasing the normal weighing capacity thereof, fluid actuated means for actuating each of said weights comprising a pivoted lever operatively connected to a piston which is adapted to reciprocate in a cylinder, a cylinder in which said piston reciprocates, ports communicating with the cylinder on opposite sides of the piston, and a valve for controlling the flow of fluid through said ports to move the piston in the desired direction.

5. A device as claimed in claim 4 in which the valve has inlet ports and exhaust ports to permit passage of the fluid to or from either end of the cylinder.

6. In a weighing apparatus, the combination with a weigh beam operatively connected to a scale pan and to an indicating means, of a weight support operatively connected to one end of the weigh beam, a series of weights adapted to be placed thereon for increasing the weighing capacity of the weigh beam, pivoted levers, trunnions on said weights adapted to be engaged by said pivoted levers for raising and lowering said weights, and fluid operated means for actuating said levers.

7. In a weighing apparatus, the combination with a weigh beam operatively connected to a scale pan and to an indicating means, of a weight support operatively connected to one end of the weigh beam, a series of weights adapted to be placed thereon for increasing the weighing capacity of the weigh beam, pivoted levers, trunnions on said weights adapted to be engaged by said pivoted levers for raising and lowering said weights, and fluid operated means for actuating said levers comprising cylinders, pistons adapted to reciprocate in said cylinders, means operatively connecting said pistons to said levers, a source of pressure fluid, and a valve for controlling the entry of the pressure fluid into said cylinders to control the movement of said pistons.

8. A weighing apparatus comprising means for increasing the normal weighing capacity of said apparatus, said means including a plurality of weights adapted to selectively engage the weighing apparatus and means for selectively actuating said weights comprising a plurality of cylinders, pistons in said cylinders operatively connected to said weights, a single valve for controlling the entry of fluid to said cylinders to actuate said pistons in such a manner that any desired one of said weights or combination thereof may be applied to said weighing apparatus.

9. A device as claimed in claim 8 in which the valve is rotatable and has a single opening connected to a source of pressure fluid, and a plurality of ports leading therefrom and adapted to selectively communicate with ports in said cylinder.

10. A weighing apparatus comprising a weigh beam, a support pivoted to one end thereof and adapted to move therewith, a scale pan on the opposite end thereof, weights adapted to be selectively placed on said support, means for restraining the support so that in any of the successive positions thereof the support is always in parallel relation to any other position thereof, fluid operated means for selectively placing the weights on the support, and a valve for controlling the fluid actuating means.

11. In a weighing apparatus, the combination with a pivoted weigh beam, of a scale pan mounted on one end thereof, an indicating means connected to the other end thereof, weights adapted to be selectively suspended from said weigh beam to vary the weighing capacity thereof, fluid pressure means for actuating said weights, a pressure fluid for actuating said fluid pressure means, and a valve adapted to control the fluid actuated means to cause the weights to be suspended from the weigh beam in a predetermined order as the valve is moved to successive positions.

12. A weighing device as claimed in claim 11 in which the weights increase the weighing capacity of the scales in multiples of the normal weighing capacity.

13. A weighing apparatus comprising a weigh-beam, indicating mechanism associated with said weigh-beam, a plurality of weights, and means positively actuated by fluid means for moving said weights into a position in which the same are supported by said beam and also for positively moving said weights into a position out of operative relation with said beam.

14. A weighing apparatus comprising a weighing mechanism having a fixed normal weighing capacity, a weight adapted to be added thereto for increasing the normal weighing capacity thereof, fluid actuated means for actuating said weight comprising a pivoted lever operatively connected to a piston which is adapted to reciprocate in a cylinder, a cylinder for said piston, ports communicating with the cylinder on opposite sides of the piston, and a valve for controlling the flow of fluid through said ports to move the piston in the desired direction.

15. A device as claimed in claim 14 in which the valve has inlet ports and exhaust ports to permit the passage of the fluid to and from either end of the cylinder.

16. In a weighing apparatus, the combination with a weigh-beam, of a load platform and indicating means operatively connected thereto, a weight adapted to be selectively positioned in operative connection with said weigh-beam to thereby vary the weighing capacity of said apparatus, and fluid pressure means for positively moving said weights to and from said position.

17. A weighing apparatus comprising means for increasing the normal weighing capacity of said apparatus, said means including a plurality of weights adapted to selectively engage the weighing apparatus, and means for selectively actuating said weights comprising a plurality of cylinders, pistons in said cylinders positively connected to said weights, a single valve for controlling the entry of fluid to said cylinders to actuate said pistons in such a manner that desired ones of said weights or various combinations thereof may be applied to said weighing apparatus.

18. In a weighing apparatus, the combination with a weigh-beam, of a cradle supported on one end of said weigh-beam, an indicating means operatively connected to said weigh-beam, a weight, and fluid means for selectively positioning said weight on said cradle.

19. In a weighing apparatus, the combination with a weigh-beam, of a cradle supported on one end of said weigh-beam, an indicating means operatively connected to said weigh-beam, weights, and fluid means for selectively positioning said weights on said cradle.

20. Weighing apparatus comprising a weigh-beam, a load platform operatively connected to said weigh-beam, indicating means operatively connected to said weigh-beam, a support mounted on said weigh-beam, weights adapted to be selectively mounted on said support, projections on said weights, forked levers adapted to engage said projections to lift the weights off said support and to deposit the weights on said support, and fluid pressure means for actuating said levers.

21. Weighing apparatus comprising a weigh-beam, a pivoted support for said weigh-beam, a cradle supported on one end of said weigh-beam, means for causing said cradle to move through successive parallel positions as said weigh-beam is moved about its pivot, weights, and fluid pressure means for depositing said weights on said cradle.

22. A weighing apparatus comprising a weigh-beam, a cradle pivotally supported on one end of said weigh-beam, a load pan operatively connected to said weigh-beam and adapted to actuate the same when a load is placed thereon, an arm operatively connected to said cradle and to a fixed support for causing said cradle to move through successive parallel positions, weights, projections on said weights, forked levers for engaging said projections for selectively depositing said weights on said platform and for removing the same therefrom, and fluid actuated means for operating said levers.

In testimony whereof I have signed my name to this specification on this 21st day of March, A. D. 1929.

CORNELIS F. M. van BERKEL.